(12) United States Patent
Cantin

(10) Patent No.: US 8,285,942 B2
(45) Date of Patent: Oct. 9, 2012

(54) REGION COHERENCE ARRAY HAVING HINT BITS FOR A CLUSTERED SHARED-MEMORY MULTIPROCESSOR SYSTEM

(75) Inventor: Jason F. Cantin, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 12/360,129

(22) Filed: Jan. 27, 2009

(65) Prior Publication Data

US 2010/0191914 A1    Jul. 29, 2010

(51) Int. Cl.
*G06F 13/00* (2006.01)
(52) U.S. Cl. ............... 711/141; 711/E12.023
(58) Field of Classification Search .............. None
See application file for complete search history.

(56) References Cited

U.S. PATENT DOCUMENTS

| | | | |
|---|---|---|---|
| 4,814,970 A | 3/1989 | Barbagelata et al. | |
| 5,963,978 A * | 10/1999 | Feiste | 711/158 |
| 6,209,067 B1 | 3/2001 | Collins et al. | |
| 6,449,700 B2 | 9/2002 | Hagersten et al. | |
| 6,751,698 B1 | 6/2004 | Deneroff et al. | |
| 6,938,128 B1 * | 8/2005 | Kuskin et al. | 711/141 |
| 7,152,191 B2 | 12/2006 | Kessler et al. | |
| 7,275,249 B1 | 9/2007 | Miller et al. | |
| 7,360,032 B2 | 4/2008 | Cantin et al. | |
| 2002/0049918 A1 * | 4/2002 | Kaxiras et al. | 713/300 |
| 2004/0117580 A1 | 6/2004 | Wu et al. | |
| 2006/0179252 A1 * | 8/2006 | Cantin et al. | 711/144 |
| 2007/0022256 A1 | 1/2007 | Cantin et al. | |
| 2007/0255908 A1 * | 11/2007 | Zeffer et al. | 711/141 |
| 2008/0155200 A1 | 6/2008 | Conway | |
| 2009/0106494 A1 * | 4/2009 | Knebel | 711/119 |

FOREIGN PATENT DOCUMENTS

WO    WO 9912102    3/1999

OTHER PUBLICATIONS

Capello et al., MPI versus MPI + OpenMP on the IBM SP for the NAS Benchmarks, pp. 1-12, 2000 IEEE.
Bentley, et al., Implicit Array Bounds Checking on 64-bit Architectures, ACM Transactions on Architecture and Code Optimization, vol. 3, No. 4, Dec. 2006, pp. 502-527, ACM, Inc., NY.

(Continued)

*Primary Examiner* — Edward Dudek, Jr.
*Assistant Examiner* — Sean D Rossiter
(74) *Attorney, Agent, or Firm* — Yudell Isidore Ng Russell PLLC

(57) ABSTRACT

A system and method for a multilevel region coherence protocol for use in Region Coherence Arrays (RCAs) deployed in clustered shared-memory multiprocessor systems which optimize cache-to-cache transfers (interventions) by using region hint bits in each RCA to allow memory requests for lines of a region of the memory to be optimally sent to only a determined portion of the clustered shared-memory multiprocessor system without broadcasting the requests to all processors in the system. A sufficient number of region hint bits are used to uniquely identify each level of the system's interconnect hierarchy to optimally predict which level of the system likely includes a processor that has cached copies of lines of data from the region.

17 Claims, 8 Drawing Sheets

OTHER PUBLICATIONS

Kontothanassis et al., Shared Memory Computing on Clusters with Symmetric Multiprocessors and System Area Networks, ACM Transactions on Computer Systems, vol. 23, No. 3, Aug. 2005, pp. 301-335, ACM, Inc., NY.

Kumar et al., Interconnections in Multi-core Architectures: Understanding Mechanisms, Overheads and Scaling, Proceedings of the 32nd International Symposium on Computer Architecture (ISCA'05), IEEE 2005.

Cantin et al., "Coarse-Grain Coherence Tracking: Regionscout and Region Coherence Arrays", IEEE Micro, vol. 26, No. 1, pp. 70-79, Jan./Feb. 2006.

Cantin, "Coarse-Grain Coherence Tracking" Dissertation, University of Wisconsin at Madison, Jan. 2006.

U.S. Appl. No. 12/144,759, "Efficient Region Coherence Protocol for Clustered Shared-Memory Multiprocessor Systems," Non-Final Office Action dated Feb. 11, 2011.

U.S. Appl. No. 12/144,759, "Efficient Region Coherence Protocol for Clustered Shared-Memory Multiprocessor Systems," Final Office Action dated Jul. 11, 2011.

Jason F. Cantin et al., Improving Multiprocessor Performance with Coarse-Grain Coherence Tracking, Proceedings of the 32nd Annual International Symposium on Computer Architecture, IEEE, 2005.

Martin Schulz et al., Owl: Next Generation System Monitoring, Proceedings of the 2nd conference on Computing Frontiers, pp. 116-124, 2005, Ischia, Italy.

Deqing Chen et al., Exploiting High-Level Coherence Information to Optimize Distributed Shared State, ACM SIGPLAN symposium on principles and practice of parallel programming (PPoPP 2003) and workshop on partial evaluation and semantics-based program manipulation (PEPM 2003), San Diego, CA.

Charles et al., X10: An Object-Oriented Approach to Non-Uniform Cluster Computing, OOPSLA 2005, Oct. 16-20, 2005, pp. 519-538, San Diego, CA, ACM 2005.

U.S. Appl. No. 12/359,665, "Region Coherence Array for a Multi-Processor System Having Subregions and Subregion Prefetching," Non-Final Office Action dated Sep. 12, 2011.

\* cited by examiner

REGION COHERENCE ARRAY HAVING HINT BITS FOR A CLUSTERED SHARED-MEMORY MULTIPROCESSOR SYSTEM

BACKGROUND OF THE INVENTION

1. Technical Field

The present invention relates in general to the field of computers, and in particular to clustered shared-memory multiprocessor systems. More particularly, the present invention relates to an improved region coherence array having hint bits associated with processors in a clustered shared-memory multiprocessor system.

2. Description of the Related Art

To reduce global bandwidth requirements within a computer system, many modern shared-memory multiprocessor systems are clustered. The processors are divided into groups called symmetric multiprocessing nodes (SMP nodes), such that processors within the same SMP node may share a physical cabinet, a circuit board, a multi-chip module, or a chip, thereby enabling low-latency, high-bandwidth communication between processors in the same SMP node. Two-level cache coherence protocols exploit this clustering configuration to conserve global bandwidth by first broadcasting memory requests for a line of data from a processor to the local SMP node, and only sending memory requests to other SMP nodes if necessary (e.g., if it is determined from the responses to the first broadcast that the requested line is not cached on the local SMP node). While this type of two-level cache coherence protocol reduces the computer system global bandwidth requirements, memory requests that must eventually be broadcast to other SMP nodes are delayed by the checking of the local SMP node first for the requested line, causing the computer system to consume more SMP node bandwidth and power. It is important for performance, scalability, and power consumption to first send memory requests to the appropriate portion of the shared-memory computer system where the cached data is most likely to be found.

Several Coarse-Grain Coherence Tracking (CGCT) methods which include use of Region Coherence Arrays (RCAs) to avoid unnecessary broadcasts of memory requests in a broadcast-based, shared-memory multiprocessor system have been discussed. The RCAs are hardware structures that track the coherence status of data at a coarse granularity. The RCAs exploit spatial locality beyond the cache line and temporal locality beyond the capacity of the cache hierarchy. However, the known CGCT methods are solely targeted for multiprocessor systems that are flat (not clustered)—that is, there is a single, flat interconnect and no multiple levels of interconnect hierarchy. In this type of system, the problem is simply determining whether or not to broadcast a memory request, which memory request is broadcast to the entire flat system. The system does not allow an optional broadcast of memory requests to only a specified portion of a non-clustered system.

Further, some proposed region protocol methods for clustered shared-memory multiprocessor systems identify only where data might only possibly be found in the system, and do not answer the important question of where to first send memory requests in the event that multiple region coherence state bits of an RCA are set. Under these methods, when multiple region coherence state bits of an RCA are set which indicate that cached copies of lines from a region of memory are detected at multiple levels of the interconnect hierarchy, no optimal routing of requests occurs. Instead, a policy decision must be made to determine where to first send requests for a line of data (e.g., send requests first to the highest system interconnect level, to reduce latency, or to send requests first to the lowest system interconnect level to conserve bandwidth, etc.).

Thus, there is a need for a region protocol which utilizes RCAs having bits that predict which part of the system can most efficiently satisfy a request for a line in the region so that requests may be automatically routed and sent first sent to the part of the system indicated by the bits.

SUMMARY OF THE INVENTION

Disclosed is a system and method for a multilevel region coherence protocol for use in Region Coherence Arrays (RCAs) deployed in clustered shared-memory multiprocessor systems which optimize cache-to-cache transfers (interventions) by using region hint bits in each RCA to allow memory requests for lines of a region of the memory to be sent to only a determined portion of the clustered shared-memory multiprocessor system most likely to satisfy the request without broadcasting the requests to all processors in the system. A sufficient number of region hint bits are used to uniquely identify each level of the system's interconnect hierarchy to optimally predict which level of the system will likely satisfy subsequent requests for lines in the region of the requested line of data. For example, if the system is comprised of three levels of interconnect (chip level, same SMP-node level, and other SMP node level); two region hint bits are needed per RCA entry to indicate the level to which to send a request for a line of data.

On processor requests, if the region protocol state indicates that the requested line of data may be cached by processors at multiple levels of the interconnect hierarchy, since multiple region coherence state bits are set, the region hint bits are used to determine which level of the interconnect hierarchy of the system to first send requests. The region hint bits record the level of the interconnect hierarchy of the system that satisfied prior requests for lines in the region made by the processor, at any time in the past, e.g., by having cached lines of the region at the level. The region hint bits may also record the level of the interconnect hierarchy of the system from which the most recent external request for lines in the region was received.

The above, as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
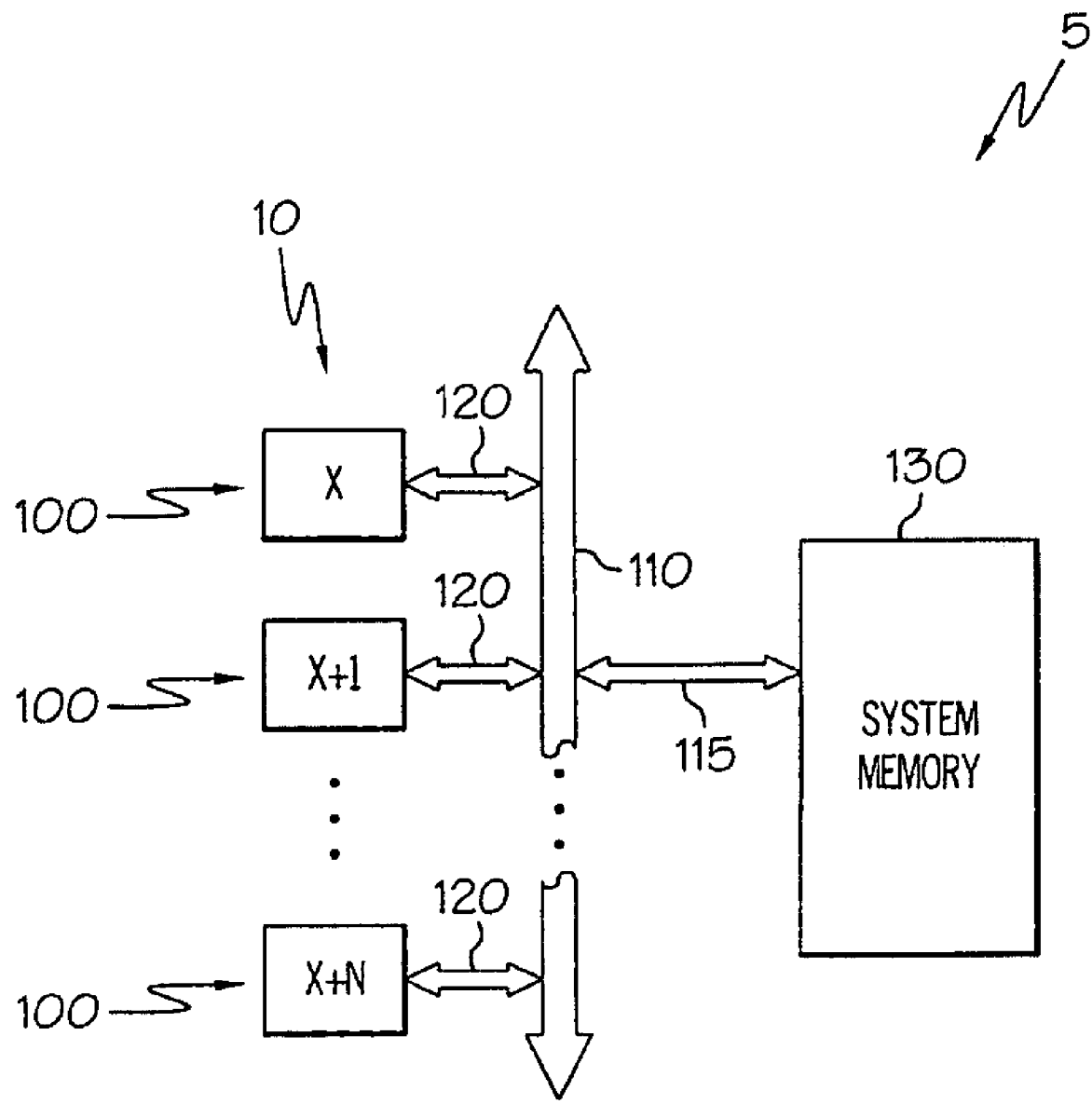
FIG. 1 depicts a high level block diagram of an embodiment of clustered processors of an SMP node, according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures. The specific reference numerals assigned to the elements are provided solely to aid in the description and not meant to imply any limitations (structural or functional) on the present invention.

The present invention provides a system and method for a multilevel region coherence protocol for use in Region Coherence Arrays (RCAs) deployed in clustered shared-memory multiprocessor systems which optimize cache-to-cache transfers (interventions) by using region hint bits in each RCA to allow memory requests for lines of a region of the memory to be sent to only a determined portion of the clustered shared-memory multiprocessor system most likely to satisfy the request without broadcasting the requests to all processors in the system. A sufficient number of region hint bits are used to uniquely identify each level of the system's interconnect hierarchy to optimally predict which level of the system will likely satisfy subsequent requests for lines in the region of the requested line of data. For example, if the system is comprised of three levels of interconnect (chip level, same SMP-node level, and other SMP node level); two region hint bits are needed per RCA entry to indicate the level to which to send a request for a line of data.

Referring to FIG. 1, a high level block diagram of an embodiment of a plurality of clustered processors $100_x \ldots 100_{x+n}$ in a multiprocessor shared-memory computer system 5, according to an embodiment of the present invention. Each of the plurality of processors $100_x \ldots 100_{x+n}$ communicates with each other, and with the system memory 130, via a system bus 110. Each of the processors $100_x \ldots 100_{x+n}$ communicates with the system bus 110 via a respective bus 120. The system memory 130 communicates with the system bus 110 via a bus 115. The cluster of processors $100_x \ldots 100_{x+n}$ forms a Symmetric Multiprocessor (SMP) node 10. The system 5 includes a plurality of such SMP nodes 10, each of which is connected to each other and to the system memory 130.

Figure 2:
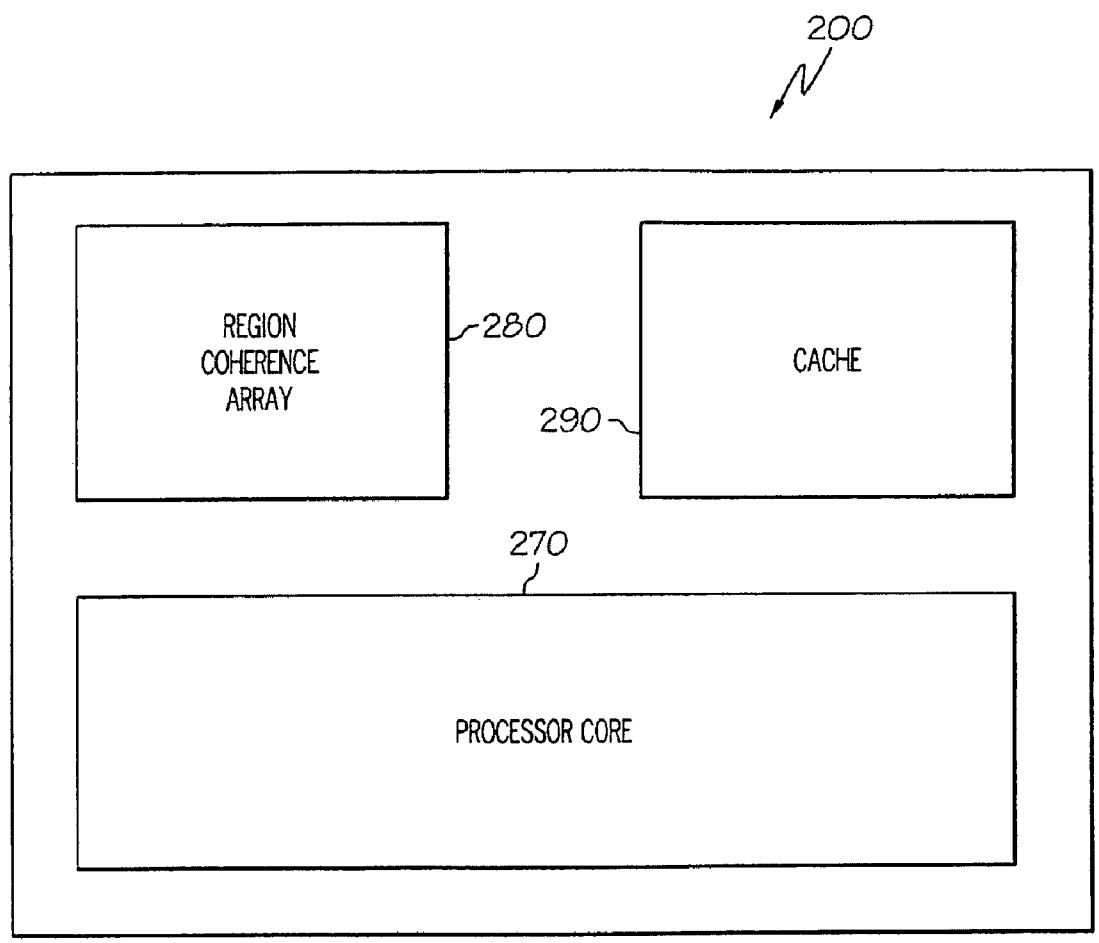
FIG. 2 depicts a high level block diagram of an embodiment of a processor of the SMP node of FIG. 1, according to an embodiment of the present invention.

Referring to FIG. 2, there is depicted an embodiment of a processor 200 which represents each of the plurality of processors $100_x \ldots 100_{x+n}$ of the shared-memory computer system 5 of the present invention. Processor 200 includes a processor core 270, a memory cache 290, and a Region Coherence Array (RCA) 280 associated with the cache 290.

In general, caches in such a system vary in size. For example, the cache 290 may include a plurality of lines of data which are each 64 bytes in size, where each line is from a region of a system memory 130 electronically connected to the processor 200, and may range in size from 128 bytes (2 lines of data) to 4 k bytes (1 physical page of the system memory 130, or 64 lines of data). In general, each cache 290 includes status of each line stored in the cache 290, and each RCA 280 includes status of a region of the system memory 130 which includes a plurality of lines of data.

The RCA 280 is an array of stored meta-data entries located in the cache hierarchy of processor 200, and is typically disposed near the lowest-level cache (for example, the L3 cache) of the processor 200 and is typically accessed in parallel with the lowest-level cache on processor requests and external snoops (described below in greater detail). The RCA 280 provides the status of a region and is tagged with an address of a defined region of the system memory 130. The RCA 280 is used to keep track of the status of the cache lines of each hierarchical level of cache associated with the processor core 270 by determining whether any lines within a region around a requested line have been previously cached, and if so the location of where those lines have been cached within the system 5. The cache 290 may be, for example, a lowest-level cache of the processor 200 in a multi-level hierarchical cache system design, where the RCA 280 would, in such example, include entries to indicate the status of all the lines in the L3 cache 290.

As described above, the shared-memory computer system which includes processor 200 may be designed such that the cache 290 is a higher-level cache (for example, an L1 cache) and all lower-level caches (for example, L2 and L3 caches, not illustrated) are not disposed within the processor 200, but are disposed elsewhere in the system, but are associated with the processor 200. In such a case, the RCA 280 includes a set-associative array of meta-data entries corresponding only to lines of data associated with the L1 cache 290, and the all lower-level caches (not illustrated) which are associated with and disposed external to the processor 200 include an associated respective RCA which includes entries corresponding only to lines of data associated with the respective external lower-level L2 and L3 caches.

Figure 2A:
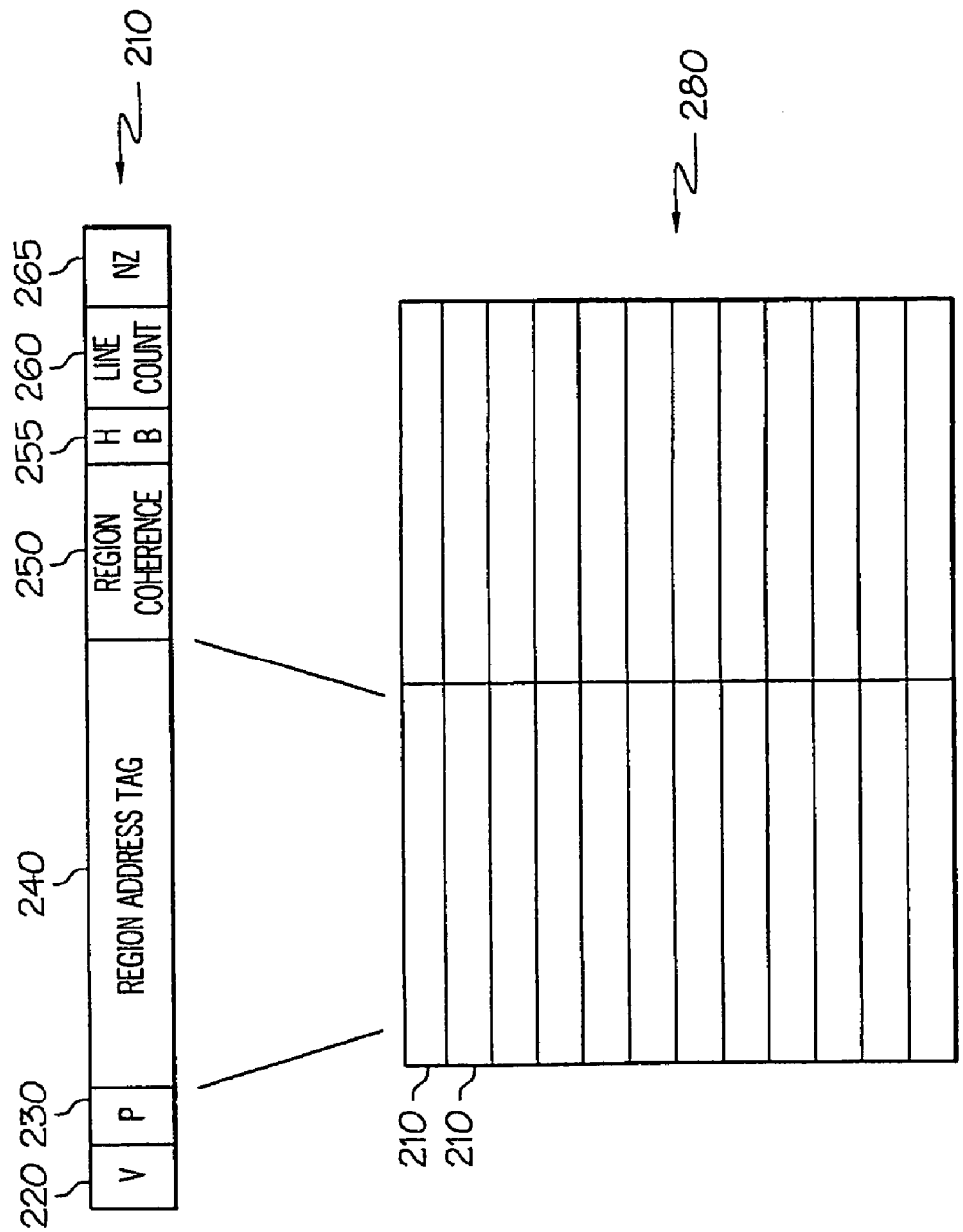
FIG. 2A is a block diagram depicting an embodiment of entries of a Region Coherence Array, according to the present invention.

Referring to FIG. 2A, each RCA 280 includes a plurality of entries 210 each of which may include a valid bit 220, one or more parity bits (or ECC bits) 230, a region address tag 240, a plurality of region coherence state bits 250, a plurality of line-count bits 260 (to keep track of how many lines from the region are cached by the processor 200), and in another embodiment a non-zero (NZ) bit 265. Each RCA entry 210 represents a large, aligned region of the system memory 130 that is a power-of-two multiple of the cache line size, and is no larger than a physical page of the system memory 130 (for example, no larger than a minimum physical page size supported by the computer system 5). The region coherence state bits 250 summarize the coherence status of the lines in the region, more specifically, the coherence status of lines in the region in the caches of other processors.

The region coherence state bits 250 may include one or more region hint bits 255 used to uniquely identify each level of the system interconnect (i.e., chip level, board level, SMP node level, etc.) where it is likely that there is a processor 200 that can source copies of lines of data from a region of the system memory 130, as described below in greater detail. The line-count bits 260 summarize whether the processor with which the RCA is associated is caching lines from the region, and are used when responding to other processors' requests to signal that lines are cached from the region around the requested line. The region coherence state bits 250 are used in conjunction with the line-count bits 260 to implement a region coherence protocol to more efficiently maintain cache coherence of the system 5.

In another embodiment, each entry 210 may also contain one or more bits to implement a least-recently-used (LRU) replacement policy for set-associative and fully-associative arrays. In a further embodiment, each entry 210 may include one or more presence bits instead of the line-count bits 260 (for example, one bit per cache line indicating whether the line is cached by the processor 200).

Entries 210 of the RCA 280 are allocated when lines from a region of memory around the requested line and are brought into the cache hierarchy of the processor 200. On broadcast snoops, requests not only check the caches 290 of other processors 200 for the requested line, but also check the RCAs 280 of the other processors 200 for the region surrounding the requested line. Each processor 200 responds with both the line status and the region status (whether the processor 200 is caching lines from the region), and the line response and region status of the processor 200 are combined with that of other processors 200 to form a combined snoop response (a line snoop response and region snoop response). Based on the region snoop responses, the region coherence state bits 250 are updated to reflect whether other processors 200 are caching lines from the same region, and this information is used to optimize the routing of future processor requests for lines in the region.

The region coherence protocol of the present invention utilizes interconnect hierarchy levels which can be devised for logical groups of processors 200, for example, for processors 200 on the same chip (not illustrated), or aggregated into the same module (not illustrated), or on the same SMP node 10, or on the same board (not illustrated), or in the same cabinet, etc., where, for example, the chip level may be at the lowest hierarchical level and the cabinet level may be the highest hierarchical level. Whether there are two or more levels of interconnect hierarchy in the system 5, the operation of the region coherence protocol is essentially the same. The bits of the region coherence state bits 250 would be encoded to indicate the level at which the processor 200 which has cached the requested line of data is disposed.

The present region coherence protocol includes one bit per level of interconnect hierarchy in the system 5, where a set value of "1" for the one bit indicates that there may be processors 200 caching copies of lines from the region at that level, and a non-set value of "0" for the bit indicates that there are no processors 200 caching copies of any lines from the region at that level. If a bit is set among the region coherence state bits 250, this indicates that at some time in the past, a processor 200 at that level cached lines from the region which includes the requested line. If the bit is not set among the region coherence state bits 250, this indicates that no processors 200 at that level within the system 5 currently cache any lines of the region which includes the requested line. The value of the bit(s) of the region coherence state bits 250 is described herein by way of example, and depends on a choice of design of the system 5.

The region coherence state bits 250 are updated with bits from the region snoop response, which also include one bit per level of the interconnect hierarchy, and are set if cached copies of lines from the region are detected at that level via the RCA 280 of another processor 200. On external requests, if the requested region is present and the line-count has a non-zero value (or a presence bit is set), the processor 200 sets the bit in the region snoop response corresponding to the lowest level of the interconnect hierarchy that the processor 200 shares with the requesting processor 200. If a global snoop is performed, the region coherence state bits 250 of the RCA 280 of the requesting processor 200 are set to the value of the region snoop response bits. If only the local SMP node 10 is snooped, the region coherence state bits 250 for that respective level of the interconnect hierarchy and for lower levels are set to be equal to the value of the level-identifying bits that is returned as the region snoop response. Thus, the region coherence state bits 250 for higher levels of the hierarchy are unchanged if a broadcast snoop did not get sent to processors 200 at those higher levels.

The region coherence state bits 250, which may be one or more bits, are used to determine where to route subsequent processor requests for lines of the same region. If no region coherence state bits 250 are set, meaning that no processor 200 in the system 5 has the requested line, then no broadcast snoop is required and the request need only obtain data from the system memory 130. If one bit of the region coherence state bits 250 is set, the request need only snoop the corresponding level of the interconnect hierarchy. If multiple bits of the region coherence state bits 250 are set, the request may need to go to one or more of the corresponding levels to find cached copies of the requested line. In contrast, the conventional manner in which the request is routed is via a system design policy decision.

For example, in a two-level system 5 which includes multiple SMP nodes 10, the system interconnect is structured to allow faster access to processors 200 on the same SMP node 10 than for other SMP nodes 10. The region coherence state bits 250 of the region protocol would contain two bits. If the first bit of the region coherence state bits 250 of a first processor 200 is set to a value of "1", this would indicate that lines from the region of a requested line may exist in a cache 290 of other processors 200 of the same SMP node 10 as the first processor 200. If the first bit of the region coherence state bits 250 of a first processor 200 is set to a value of "0", this would indicate that no lines from the region of a requested line exist in a cache 290 of other processors 200 of the same SMP node 10 as the first processor 200. Similarly, if the second bit of the region coherence state bits 250 of a first processor 200 is set to a value of "1", this would indicate that lines from the region of a requested line may exist in a cache 290 of other processors 200 of other SMP nodes 10 than the SMP node 10 of the first processor 200. If the second bit of the region coherence state bits 250 of a first processor 200 is set to a value of "0", this would indicate that no lines from the region of a requested line exist in a cache 290 of other processors 200 of SMP nodes 10 of other SMP nodes 10 than the SMP node 10 of the first processor 200.

The state of the region coherence state bits 250 are such that they are independent from each other, such that a state of one bit does not imply a state of the other bit. Also, there is no invalid state which is a combination of these bits. In this example, the state "11" of the region coherence state bits 250 indicates that the requested line may be cached by processors 200 on the same SMP node 10 as the first processor 200, while the state "10" indicates that no processor 200 on the same SMP node 10 as the first processor 200 is caching the requested line (but that processors 200 on other SMP nodes 10 may be.)

For cases where a snoop is not needed at a level of the interconnect hierarchy for coherence, but the physical system memory 130 resides on a memory controller (not illustrated) at that level, a "silent snoop" may be sent. A silent snoop is a special, non-speculative request that other processors 200 ignore. Upon receiving a silent snoop request, the memory controller accesses DRAM (not illustrated) and sends the data back to the requesting processor 200 without waiting for a combined snoop response. Silent snoop requests are ignored by other processors 200, and therefore silent snoops have no snoop response.

In a conventional system, multiple policies may be used in cases where multiple region coherence state bits 250 are set. To minimize bandwidth requirements at the upper levels of the interconnect hierarchy, requests can be pumped from the lowest level of the interconnect hierarchy for which the corresponding region coherence state bit 250 is set, to the highest level, until a satisfying snoop response is received, indicating that it has been determined the location of where the processor 200 can get the requested line of data. To eliminate double-pumps (i.e., requests that iteratively snoop levels of the interconnect hierarchy), requests can be sent first to the highest level for which the corresponding region coherence state bit 250 is set. Otherwise, memory read requests could be pumped to lower levels of the interconnect hierarchy to attempt to find a source copy of the line of data, and requests for a modifiable copy of a line of data could be pumped to the highest level right away to quickly invalidate cached copies of the requested line. Additionally, memory read requests can otherwise be sent to the highest level of the interconnect hierarchy right away to minimize latency, while less latency-critical write-backs are pumped to conserve global bandwidth of the system 5.

TABLE 1

| Other Nodes | SMP Node | Region Coherence State Definition |
|---|---|---|
| 0 | 0 | Region not cached elsewhere |
| 0 | 1 | Region cached by processors on same SMP node only |
| 1 | 0 | Region cached by processors on other nodes only, not by processors on the same SMP node. |
| 1 | 1 | Region cached by processors on the SMP node and other SMP nodes |

As shown above in Table 1, an example is depicted of an RCA 280 for a clustered multiprocessor system 5 having a two-level interconnect hierarchy of the present invention. Table 1 depicts an example of the present region coherence protocol embodied as a two-bit region coherence protocol for a clustered shared-memory multiprocessor system 5 having two levels of interconnect hierarchy (for example, a first level for the local SMP node 10, and a second level for all SMP nodes 10 of the system 5). A processor 200 may send a memory request to either the processors 200 on the same SMP node 10, or to all the SMP nodes 10 in the system 5.

As shown above in Table 2, an example is depicted of an RCA 280 for a clustered multiprocessor system 5 having a three-level interconnect hierarchy (i.e., a scheme regarding another embodiment of an implementation of the present region coherence protocol) such as, for example, a chip (not illustrated) which includes the processor 200, the local SMP node 10, and other SMP nodes 10.

For the embodiment of Table 1 and/or Table 2, there are one or more bits (in this example, one bit) of the region coherence state bits 250 for each level to indicate whether a processor 200 may be caching lines from the region at that respective level. If no bits are set (e.g., the first case, where each of the region coherence state bits 250 has a zero value), the request does not need to be broadcast to any level of the hierarchy, and the request may simply be sent to the system memory 130 (i.e., as a silent snoop). If one bit is set, whether for the chip, the SMP node 10, or the other SMP nodes 10, then only a broadcast to that level of the interconnect hierarchy is needed to obtain the line coherently. If multiple bits of the region coherence state bits 250 are set, conventionally it is a matter of policy of the system 5 regarding how the system 5 routes the memory request, where the system 5 does not waste time and bandwidth snooping levels of the interconnect hierarchy where no cached copies of the requested line are known to exist. However, the present invention does not utilize the conventional method of using policy decisions to send requests, and instead utilizes region hint bits 255, described below, to indicate where requests are to be sent.

Figure 3:
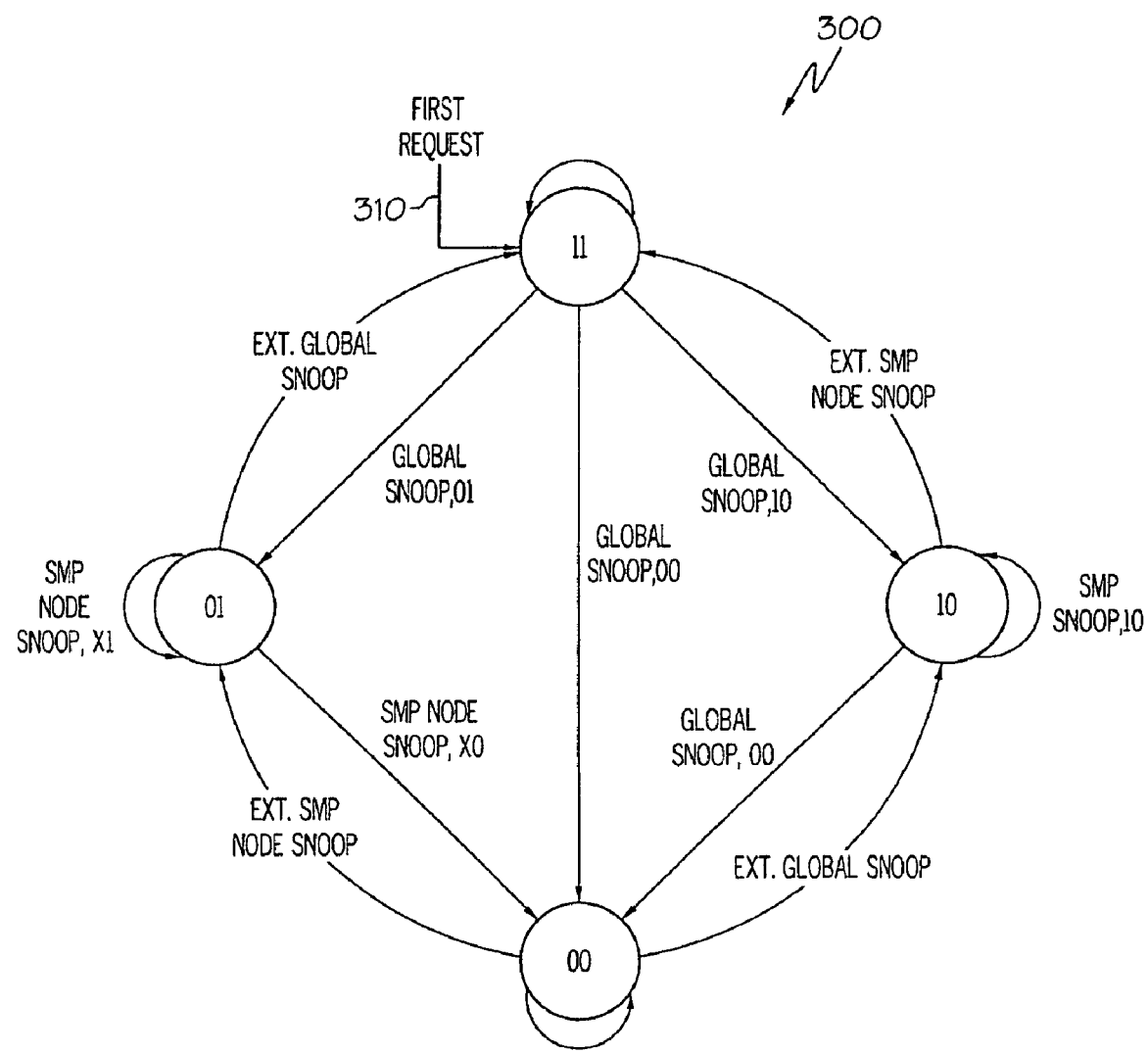
FIG. 3 is a state diagram of an embodiment of a region coherence protocol operation, according to the present invention.

FIG. 3 depicts a state diagram 300 illustrating how the present region coherence protocol may be implemented to operate for the system 5 having the two-level interconnect hierarchy, as depicted in Table 1. The embodiment of FIG. 3 is for illustrative purposes only and may have other configurations. A state machine implementing this state diagram 300 might not need to be implemented, for the region coherence state can be updated by simply overwriting one or more of the of the region coherence state bits 250. For each state transition of the state diagram 300 of FIG. 3 there is depicted a request that triggered it, and if it is request of a processor 200, then the region snoop response is also shown.

The two region coherence state bits 250 of this embodiment are conservatively initialized to have a value of "11" on allocation, to indicate that cached copies of lines in the region could be found anywhere in the system 5. The left-hand bit of the region coherence state bits 250 indicates whether there are

TABLE 2

| Other Nodes | SMP Node | Chip | Region Coherence State Definition |
|---|---|---|---|
| 0 | 0 | 0 | Region not cached by other processors |
| 0 | 0 | 1 | Region cached by other processors on the same chip only |
| 0 | 1 | 0 | Region cached by other processors on other chips on the same SMP node only |
| 0 | 1 | 1 | Region cached by other processors on the same chip & other processors in the same SMP node only |
| 1 | 0 | 0 | Region cached by processors on other SMP nodes only |
| 1 | 0 | 1 | Region cached by other processors on the same chip & processors on other SMP nodes only. Not cached by processors on other chips in the same SMP node. |
| 1 | 1 | 0 | Region cached by processors on other chips on the same SMP node & processors on other SMP nodes only |
| 1 | 1 | 1 | Region cached by other processors on the same chip, other chips on the same SMP node, & other SMP nodes | cached copies of lines on other SMP nodes 10, and the right-hand bit indicates whether there are cached copies of lines on the same SMP node 10. If the left-hand bit is set to a value of "1", a global snoop may be required to obtain a copy of the data. In this simple example, this is the action taken, though the SMP node 10 can be pumped first. If the right-hand bit is set to a value of "1", there may be cached copies of lines in a cache on the same SMP node 10, and a node snoop may save global bandwidth of the system 5. If neither bit is set, a silent snoop is sent to the system memory 130.

In this embodiment, a global snoop is performed on the first request 310 for a line in the region. Doing so allows the region coherence state to be updated to reflect the current state of the system 5, and avoids a double-pump on the first request to a line in the region. Depending on the region snoop response, the region coherence state may be set to any of the four states (i.e., the "00", "01", "10", and "11" states). To simplify an implementation, the region coherence state bits 250 may be overwritten with the region snoop response bits from a global snoop. If there is an external request for a line in the region, the bit corresponding to the location of the requesting processor 200 in the system 5 may be set, which downgrades the region. Subsequent snoops for requests made by the processor 200 also update the state with their responses. Global snoops obtain information from all processors 200 and update all the region coherence state bits 250 by, for example, overwriting them with bits from the global snoop response. SMP node snoops only obtain information from other processors 200 on the same SMP node 10, and only update the right-hand bits pertaining to the SMP node 10 and lower levels of the interconnect hierarchy. The "X" in the region snoop response of node snoops represents a "don't care" condition, indicating that X=0, or X=1. Because coherence status was not collected for the levels of the interconnect hierarchy to which these bits pertain, they are not used to update the region coherence state, and so their value is a "don't care" condition.

Figure 4:
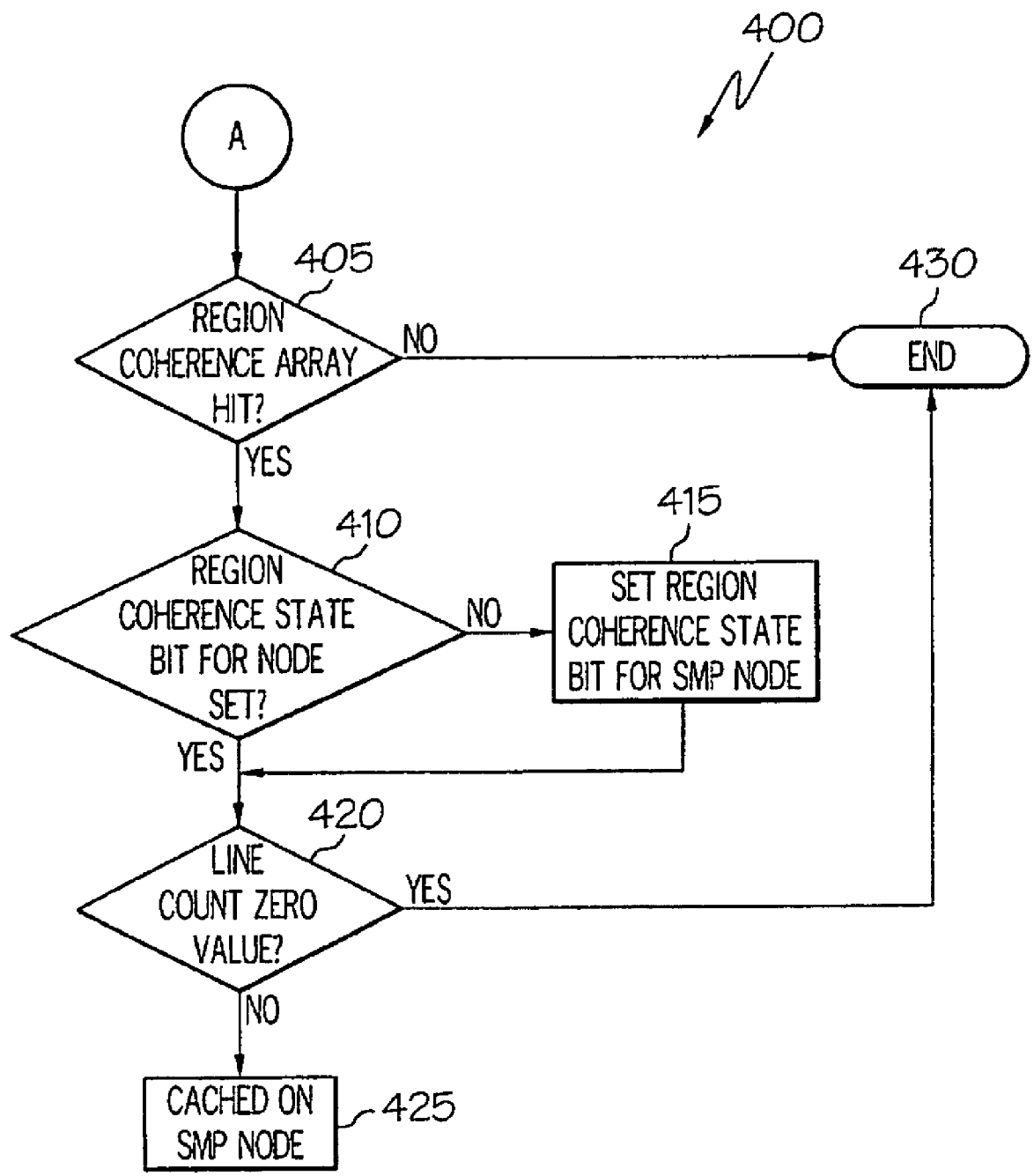
FIG. 4 is a high level logical flowchart of an embodiment of a region coherence protocol operation having an external request from a processor of the same SMP node, according to the present invention.
Figure 5:
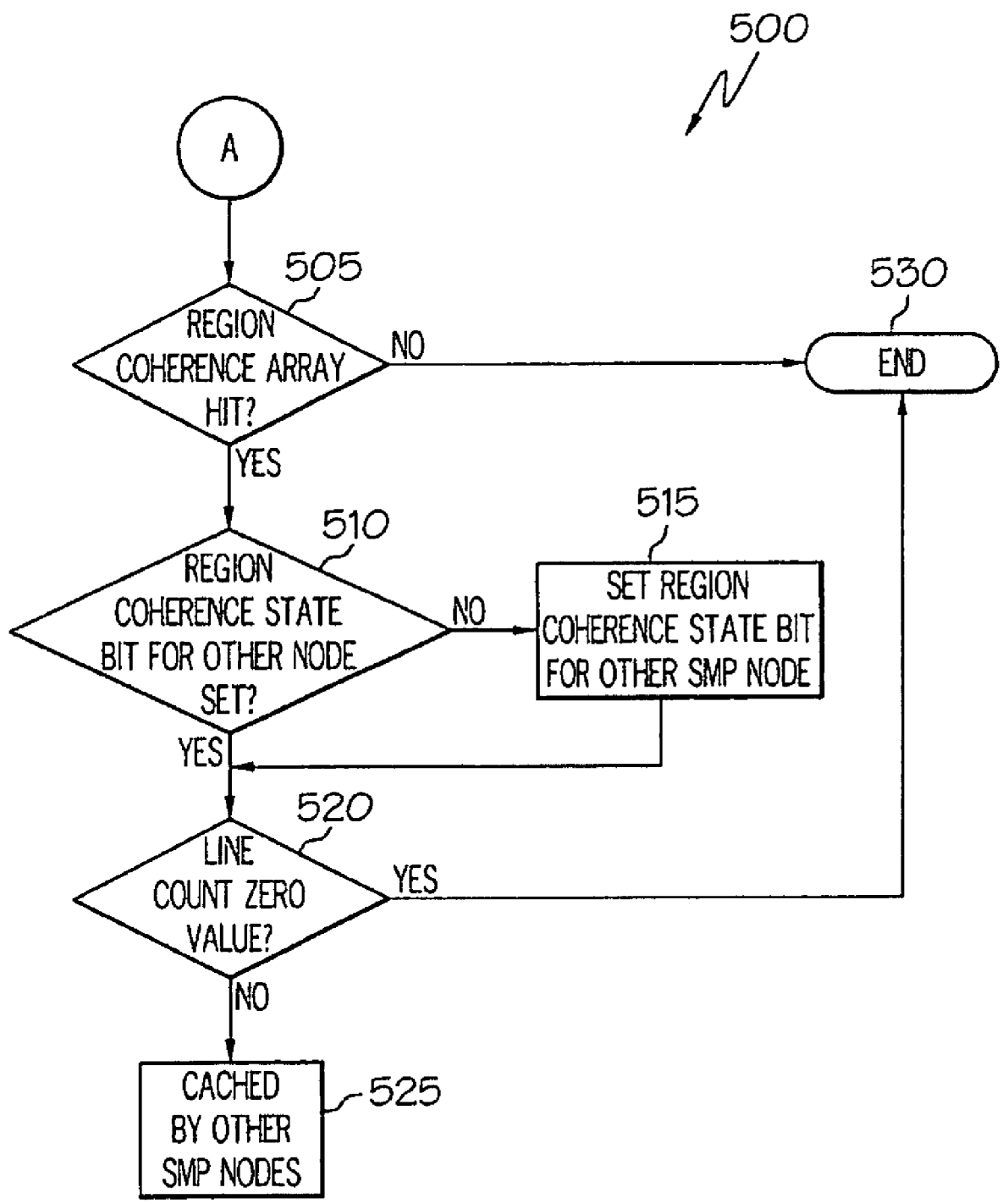
FIG. 5 is a high level logical flowchart of an embodiment of a region coherence protocol operation having an external request from a processor of another SMP node, according to the present invention.

Referring to FIG. 4, there is illustrated a high level logical flowchart of an embodiment of a region coherence protocol operation 400 having an external request from a processor of the same SMP node 10 (for an embodiment of a two-level interconnect hierarchy), according to the present invention. Referring to FIG. 5, there is illustrated a high level logical flowchart of an embodiment of a region coherence protocol operation 500 having an external request from a processor of another SMP node 10 (for an embodiment of a two-level interconnect hierarchy), according to the present invention. For FIGS. 4 and 5, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

For clarity, FIGS. 4 and 5 illustrate actions taken on external snoop requests (from a processor 200 of the same SMP node 10, and from a processor 200 of another SMP node 10, respectively) to generate information regarding where a requested line of data can be found. Note also from FIGS. 4 and 5 that the present region coherence protocol also implements an improved form of dynamic self-invalidation, described above, that does not throw away the external status of a region in the process of giving another processor 200 exclusive access to the region. The processor 200 indicates that it has no lines cached even in cases where the region which includes the requested line is indicated in the RCA 280, provided the line-count value is zero or all the presence bits have a zero value. Thus, the region is not actually invalidated.

Referring to FIG. 4, a region coherence protocol operation 400 is depicted having an external request for a line at operation A from a processor of the same SMP node 10. For external snoop requests from the same SMP node 10, the processor 200 responds at operation 405 that it is caching lines from the region of the requested line when the region is indicated in the RCA 280 of the processor 200 by an examination of the region coherence state bits 250 of the RCA 280 at operation 405, and the line-count value (or presence bits value) is equal to a non-zero value as determined at operation 420. If it is determined at operation 405 that the processor 200 is not caching lines from the region of the requested line, the operation 400 terminates at operation 430. If the region is not indicated in the RCA 280 at operation 405, or if the region is indicated in the RCA 280 at operation 405 but there is an associated zero line-count value (or zero value presence bits) determined at operation 420, the operation 400 terminates at operation 430 and processor 200 responds that it is not caching lines from the region. At operation 410, it is determined whether the region coherence state bits 250 of the RCA 280 are set to indicate that lines of the region are being cached in the SMP node 10 to which the requesting processor 200 belongs. If not, the region coherence state bits 250 are set at operation 415 to indicate the fact.

Referring to FIG. 5, a region coherence protocol operation 500 is depicted having an external request for a line at operation A from a processor of another SMP node 10 than the processor 200. For external snoop requests from the same SMP node 10, the processor 200 responds at operation 505 that it is caching lines from the region of the requested line when the region is indicated in the RCA 280 of the processor 200 by an examination of the region coherence state bits 250 of the RCA 280 at operation 505, and the line-count value (or presence bits value) is equal to a non-zero value as determined at operation 520. If it is determined at operation 505 that the processor 200 is not caching lines from the region of the requested line, the operation 500 terminates at operation 530. If the region is not indicated in the RCA 280 at operation 505, or if the region is indicated in the RCA 280 at operation 505 but there is an associated zero line-count value (or zero value presence bits) determined at operation 520, the operation 500 terminates at operation 530 and processor 200 responds that it is not caching lines from the region. At operation 510, it is determined whether the region coherence state bits 250 of the RCA 280 are set to indicate that lines of the region are being cached in the SMP node 10 to which the requesting processor 200 belongs. If not, the region coherence state bits 250 are set at operation 515 to indicate the fact.

Region coherence state bits 250 are not used in the present region coherence protocol to encode information about lines cached by the processor 200, since this information is indicated by the line-count bits 260. Instead, the region coherence protocol only encodes the region coherence state bits 250 of the RCA 280 at operation 515 to indicate the external status of a region for the benefit of the processor 200 by indicating whether or not any processor 200 at a given level of the interconnect hierarchy (in this example, another SMP node 10) is caching lines from the region. Therefore, a region snoop response is based entirely on the value of the line-count bits (or presence bits) 260 of the RCA 280. If there is a valid entry to indicate at operation 505 that the region is indicated in the RCA 280, this indicates that the processor 200 is caching lines from the region if the line-count bits 260 indicate at operation 520 a non-zero value (or the presence bits indicate a non-zero value), and not otherwise. This information is communicated to the requesting processor 200 via the region snoop response, leaving the region coherence state bits 250 unchanged. If there is no valid entry at operation 505 to indicate the region in the RCA 280, this indicates that the processor 200 is not caching any lines from the region.

Referring again to FIG. 2A, the region hint bits 255 may be included as part of the region coherence state bits 250 of each RCA 280 and are used to uniquely identify a level of the interconnect hierarchy of the system 5 which includes at least one processor 200 which is likely to satisfy requests for lines of the requested region of system memory 130. For example, if the system 5 includes three levels of interconnect (chip level, same SMP node level, and other SMP node level) then two region hint bits 255 are used per RCA entry 210 to identify each interconnect level of the system 5. In another embodiment, the region hint bits 255 may be included within the RCA entry 210 but be separate from the region coherence state bits 250. In other embodiments, additional hint bits 255 may be used to identify the interconnect level of the system 5. Alternatively, fewer hint bits 255 may be used to identify a subset of the levels of interconnect hierarchy that likely contain one or more processors 200 which are likely to satisfy requests for lines from the region to conserve storage space, but at a loss of precision.

When a processor 200 requests a line of data, and if the region protocol state indicated by the region coherence state bits 250 shows that the line of data may be cached by other processors 200 at multiple levels of the interconnect hierarchy of the system 5 (i.e., multiple region coherence state bits are set), then the region hint bits 255 are used to predict at which level of the interconnect hierarchy requests for the line of data should first be sent. The region hint bits 255 record the level of the interconnect hierarchy that has satisfied prior requests for lines in the region made by the processor 200, by exploiting spatial and temporal locality. The region hint bits 255 may additionally record the level of the interconnect hierarchy of processors 200 that have most recently requested lines from the same region as the requested line of data. This helps to handle cases where a region first becomes shared at multiple levels of the interconnect hierarchy by setting the region hint bits 255 to the level of the most recent request. Also, processors of some systems, such as IBM Power4/Power5/Power6 systems, are most likely to have source copies of lines in the region due to cache coherence protocols having migratory data optimizations, exploiting a form of multi-process temporal locality.

For correctness, the region protocol state as indicated by the region coherence state bits 250 is conventionally initialized to all one's on allocation, where all levels of the interconnect hierarchy may have processors 200 caching data from the region. Hence, multiple region coherence state bits 250 are set and the region hint bits 255 may be initialized via a simple policy to optimize the first request by a processor 200 for a line in the region. Otherwise, the system 5 could take normal actions that result from all of the region coherence state bits 250 being set. As a policy of the system 5, the region hint bits 255, which may or may not be disposed among the region coherence state bits 250, may be initialized on a first request for a line of data for a region to point to a low level of the interconnect hierarchy to conserve global bandwidth, or to point to a high level to minimize latency.

Figure 6:
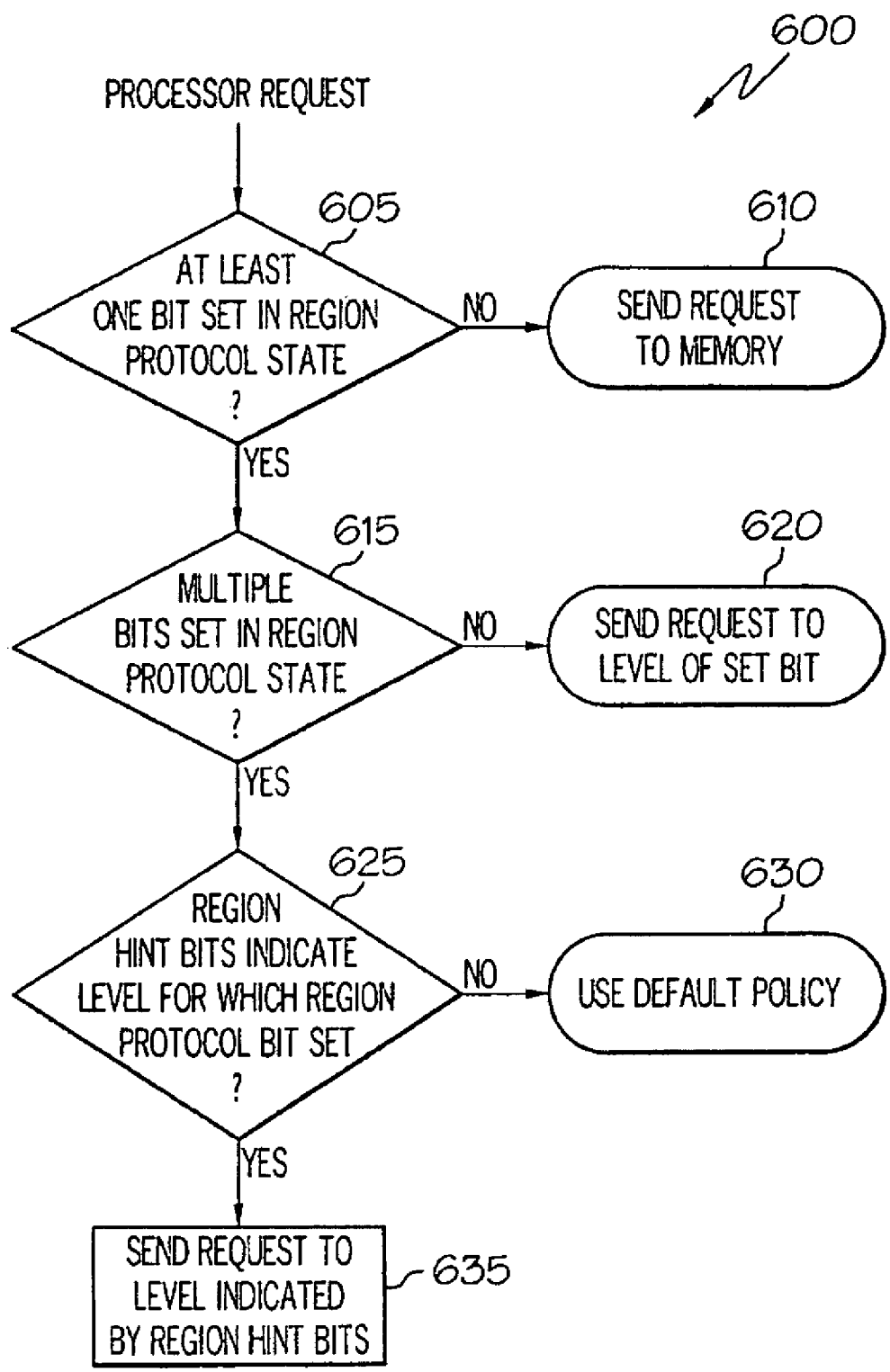
FIG. 6 is a high level logical flowchart of an embodiment of a method of a line request of the present invention which utilizes region hint bits.
Figure 7:
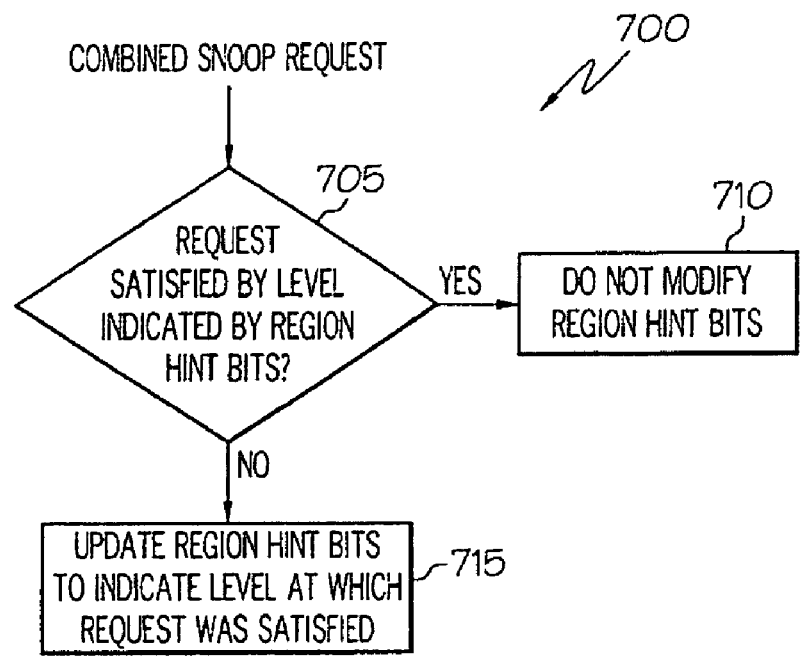
FIG. 7 is a high level logical flowchart of an embodiment of a method of the present invention to update region hint bits using a combined snoop response.
Figure 8:
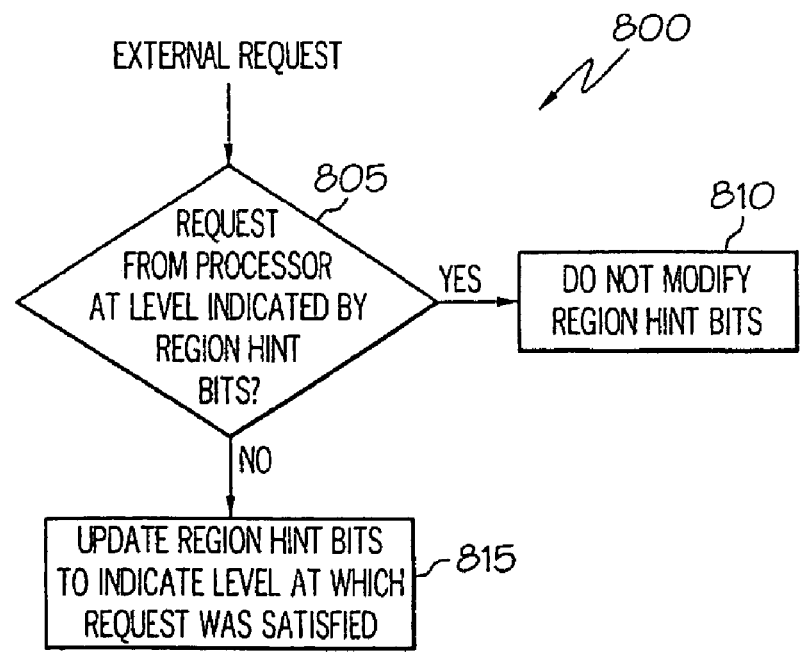
FIG. 8 is a high level logical flowchart of an embodiment of a method of the present invention to update region hint bits using an external request.

Referring to FIG. 6, there is illustrated a high level logical flowchart for a line request operation 600 for a processor 200 which utilizes region hint bits 255. Referring to FIG. 7, there is illustrated a high level logical flowchart of an updating operation 700 to update region hint bits 255 of a processor 200 using a combined snoop response. Referring to FIG. 8, there is illustrated a high level logical flowchart of an operation 800 for a line request from an external processor 200 which utilizes region hint bits 255 associated with a local processor 200. For FIGS. 6, 7 and 8, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Referring to FIG. 6, a high level logical flowchart of an operation 600 is depicted to illustrate an embodiment of a method of a line request (a request for a line of data by a processor 200) using the present invention which utilizes region hint bits 255. If at block 605 it is determined for a processor request (a request for a line of data by a processor 200) that no bits are set in the region protocol state of the region coherence state bits 250, then there are no cached copies of the requested data with any processor 200. At block 610, the processor request is sent to the system memory 130, as described above. However, if it is determined at block 605 that at least one bit in the region protocol state is set, this indicates that there may be cached copies of the requested data at the corresponding level(s) of the interconnect hierarchy.

If it is determined at block 615 that only one bit in the region protocol state is set, then at block 620 the processor request is sent only to the hierarchy level indicated by the one set bit. If it is determined at block 615 that multiple bits are set in the region protocol state, this indicates that there may be cached copies of the requested data at one or more of the corresponding hierarchy levels of the system 5. At block 625, it is determined whether the region hint bits 255 indicate a level for which the region protocol bit(s) is/are set. If there is no such indication by the region hint bits 255, then at block 630 the system 5 defaults to a predetermined default policy (similar to a conventional system) regarding where to send the processor request (e.g. first to lowest level indicated by the region coherence state bits 250, or first to highest level indicated by the region coherence state bits 250, etc.) If there is such an indication at block 625, then the processor request for the line of data is sent to the level indicated by the region hint bits 255.

In general, the region hint bits 255 always point to a level of the interconnect hierarchy of the system 5 for which a corresponding bit in the region protocol state (of the region coherence state bits 250) is set. The region hint bits 255 either point to a level at which a request was satisfied (hence the line of data was cached at that level at the time, and the corresponding bit in the region protocol state remains set), or a level from which an external processor request was received (and hence the corresponding bit in the region protocol state is set). Though the region protocol state itself is conservative, there is never a case using the present invention that the region hint bits 255 point to a level of the interconnect hierarchy where cached copies of lines of data are known not to exist. However, if the region protocol is optimized in such a way that a region protocol state bit can be cleared without the requesting processor 200 having first sent a request to that level of the interconnect hierarchy, the region hint bits 255 may occasionally point to levels of the interconnect hierarchy where cached copies of lines of data are known not to exist. In such a case, a policy can be used to update the region hint bits 255 when the region coherence state bits 250 change (e.g., set the region hint bits 255 to point to the highest level of the interconnect hierarchy, or to the closest level with respect to the currently pointed-to level for which the corresponding region protocol state bit is set).

Referring to FIG. 7, a high level logical flowchart of an operation 700 is depicted to illustrate an embodiment of a method of the present invention to update region hint bits 255 using a combined snoop response. At block 705 it is determined whether a processor request for a line of data is satisfied by the hierarchy level indicated by the region hint bits 255. A request is satisfied if a satisfying response is received, such as an indication that a processor 200 at that level has and will provide the requested data. If such is the case, the region hint bits 255 are not updated, as depicted at block 710. If the request was satisfied, but by a processor 200 also sharing a lower level of the interconnect hierarchy with the requesting processor 200, the region hint bits 255 are updated to indicate the lower level, for efficiency. If it is determined at block 705 that the processor request is not satisfied, then at block 715 the region hint bits 255 are updated to indicate the level at which the processor request for the line of data was eventually satisfied, by using the most current combined snoop request.

Referring to FIG. 8, a high level logical flowchart of an operation 800 is depicted to illustrate an embodiment of a method of the present invention to update region hint bits 255 in response to an external request (i.e., a request by an external processor 200 for a line of data). At block 805 it is determined whether a processor request for a line of data is from a level indicated by the region hint bits 255. If so, then the region hint bits 255 are not updated, as depicted at block 810. If it is determined at block 805 that the external processor request for the line of data is not from a level indicated by the region hint bits 255, then at block 815 the region hint bits 255 are updated to indicated the level at which the processor request originated.

In another embodiment of the present invention, additional region hint bits 255 may be implemented to incorporate history into the hierarchy level prediction. An additional set of region hint bits 255 may be implemented to point to the level of the interconnect hierarchy that satisfied a previous request. If the first set of region hint bits 255 are found to be incorrect after a broadcast snoop is performed, the additional set of region hint bits 255 may be used to route a subsequent broadcast snoop (provided that the additional set of region hint bits 255 points to a higher level of the interconnect hierarchy than the first set). There can be as many sets of region hint bits 255 as there are levels of interconnect hierarchy, minus one.

In another embodiment of the present invention, additional region hint bits 255 may be implemented for different request types. A set of region hint bits 255 may be used for read requests, and a separate set of region hint bits 255 may be used for reads to obtain a modifiable copy of the data. This improves prediction accuracy, as the first set of region hint bits 255 tracks levels where cached/source copies of data exist, and the second set of region hint bits 255 tracks the level at which, requests must be sent to locate all of the cached copies of the requested line (or an exclusive copy).

In another embodiment, the region hint bits 255 are not updated in response to all external requests, but only for those external requests that obtain a source copy of the data. For example, we may update the region hint bits 255 in response to read requests, but not in response to requests to upgrade the state of a line from the region.

It is understood that the use herein of specific names are for example only and not meant to imply any limitations on the invention. The invention may thus be implemented with different nomenclature/terminology and associated functionality utilised to describe the above devices/utility, etc., without limitation. While the present invention has been particularly shown and described with reference to a preferred embodiment, it will be understood by those skilled in the art that various changes in form and detail may be made therein without departing from the spirit and scope of the invention. Furthermore, as utilized in the specification and the appended claims, the term "computer" or "system" or "computer system" or "computing device" includes any data processing system including, but not limited to, personal computers, servers, workstations, network computers, main frame computers, routers, switches, personal digital assistants (PDAs), telephones, and any other system capable of processing, transmitting, receiving, capturing, and/or storing data.

It should be understood that at least some aspects and utilities of the present invention may alternatively be implemented in a computer-storage medium that contains a program product. That is, the present invention can also be embodied as programs defining functions in the present invention as computer-readable codes on a computer-readable medium. The computer-storage medium may be a computer-readable medium, which can include a computer-readable recording medium and/or a computer-readable transmission medium, and/or a computer-readable/writeable recording medium. The computer-readable recording medium is any data storage device that can store data which can be thereafter read by a computer system. Examples of a computer-readable recording medium include read-only memory (ROM), and examples of a computer-readable/writeable recording medium include random-access memory (RAM), CD-ROMs, magnetic tapes, floppy disks, hard disk drives, memory stick devices, and optical data storage devices.

The computer-readable recording medium can also be distributed over network coupled computer systems so that the computer-readable code is stored and executed in a distributed fashion. The computer-readable transmission medium can transmit data via a wired or wireless configuration (e.g., wired or wireless data transmission through the Internet). Also, functional programs, codes, and code segments to accomplish the present invention can be easily construed by programmers skilled in the art to which the present invention pertains. Further, it is understood that the present invention may be implemented as a system having means in the form of hardware, software, or a combination of software and hardware as described herein, or their equivalent.

What is claimed is:

1. A method of processing memory requests for a line of data in a multi-level clustered shared-memory multiprocessor system, the method comprising:

a processor generating a request for a line of data storable in a system memory;

in response to a determination that a region protocol state of an entry within a region coherence array of the system indicates that the requested line of data may be cached by processors at multiple levels of interconnect within an interconnect hierarchy of the multi-level system, determining whether one or more region hint bits within the region protocol state of an entry in the region coherence array associated with the requesting processor provide an indication that the requested line of data is cached by at least one level of interconnect from the multiple levels of interconnect within the interconnect hierarchy of the system, wherein the region hint bits uniquely identify each level of interconnect within the interconnect hierarchy where cached copies of the requested line of data may be stored;

in response to determining the one or more region hint bits provide an indication that the requested line of data is cached at a specific level of interconnect within the interconnect hierarchy, sending the request to the at least one level of interconnect within the interconnect hierarchy indicated by the region hint bits;

wherein a level of interconnect is one of a chip level interconnect, a same processor node interconnect or another processor node interconnect;

wherein the region coherence array is a meta-data array located in a cache hierarchy;

determining whether the request for the line of data was satisfied by the specific level of interconnect indicated by the region hint bits;

in response to determining the request for the line of data was not satisfied by the specific level of interconnect indicated by the region hint bits, updating, utilizing a most current combined snoop response, the region hint bits to indicate a level of the interconnect hierarchy at which the request for the line of data was actually satisfied; and sending the updated region hint bits to one or more levels of interconnect within the interconnect hierarchy indicated by the region hint bits that do not satisfy the request for the line of data.

2. The method of claim 1, further comprising:

in response to determining the one or more region hint bits do not provide any indication that the requested line of data is cached by at least one level of interconnect within the interconnect hierarchy, sending the request for the line of data first to a lowest level of interconnect within the interconnect hierarchy of the system.

3. The method of claim 1, further comprising:

in response to determining the one or more region hint bits do not provide any indication that the requested line of data is cached by at least one level of interconnect within the interconnect hierarchy, sending the request for the line of data first to a highest level of interconnect within the interconnect hierarchy of the system.

4. The method of claim 1, further comprising:

determining if the more than one of the region hint bits within the region protocol state are set;

wherein the more than one of the region hint bits of the region protocol state being set provides an indication that the requested line of data may be cached by processors at more than one level of interconnect within the interconnect hierarchy.

5. The method of claim 1, wherein the region hint bits also provide an indication of a level of interconnect within the interconnect hierarchy that a most recent external request for lines of data in the region of the requested line of data was received.

6. The method of claim 1, wherein:

the region hint bits further comprise one or more of:
 a first set of region hint bits used for reading requests;
 a second set of region hint bits used for reads to obtain a modifiable copy of the requested data;
 one or more additional region hint bits to contain a history of hierarchical level of interconnect prediction; and
 one or more additional region hint bits that point to a level of interconnect within the interconnect hierarchy that satisfied a previous request and that are used to route a broadcast snoop; and the number of region hint bits used by the system is equal to the number of levels of interconnect of the interconnect hierarchy minus one.

7. A region coherence protocol control system, comprising:

a system memory;
a multi-level clustered shared-memory multiprocessor system having multiple levels of interconnect within a hierarchy;
 a region coherence array associated each processor in the clustered shared-memory multiprocessor system to provide a region protocol state of a region of the system memory a logic executing on the multi-level clustered shared-memory multiprocessor system that:
 generates a request for a line of data storable in a system memory;
 in response to a determination that a region protocol state of an entry within a region coherence array of the system indicates that the requested line of data may be cached by processors at multiple levels of interconnect within an interconnect hierarchy of the multi-level clustered shared-memory multiprocessor system, determines whether one or more region hint bits within the region protocol state of an entry in the region coherence array associated with the requesting processor provide an indication that the requested line of data is cached by at least one level of interconnect within interconnect within the multiple levels of interconnect within the interconnect hierarchy of the system, wherein the region hint bits uniquely identify each level of interconnect within the interconnect hierarchy where cached copies of the requested line of data may be stored;
 in response to determining the one or more region hint bits provide an indication that the requested line of data is cached at a specific level of interconnect within the interconnect hierarchy, sends the request to the at least one level of interconnect within the interconnect hierarchy indicated by the region hint bits;
 wherein a level of interconnect is one of a chip level interconnect, a same processor node interconnect or another processor node interconnect;
 wherein the region coherence array is a meta-data array located in a cache hierarchy;
 determines whether the request for the line of data was satisfied by the specific level interconnect indicated by the region hint bits;
 in response to determining the request for the line of data was not satisfied by the specific level of interconnect indicated by the region hint bits, updates, utilizing a most current combined snoop response, the region hint bits to indicate a level of interconnect within the interconnect hierarchy at which the request for the line of data was actually satisfied; and
 sends the updated region hint bits to one or more levels of interconnect within the interconnect hierarchy indicated by the region hint bits that do not satisfy the request for the line of data.

8. The region coherence protocol control system of claim 7, the logic executing on the multi-level clustered shared-memory multiprocessor system further comprising logic that:

in response to determining the one or more region hint bits do not provide any indication that the requested line of data is cached by at least one level of interconnect within the interconnect hierarchy, sends the request for the line of data first to a lowest level of interconnect within the interconnect hierarchy of the system.

9. The region coherence protocol control system of claim 7, the logic executing on the multi-level clustered shared-memory multiprocessor system further comprising logic that:

in response to determining the one or more region hint bits do not provide any indication that the requested line of data is cached by at least one level of interconnect within the interconnect hierarchy, sends the request for the line of data first to a highest level of interconnect within the interconnect hierarchy of the system.

10. The region coherence protocol control system of claim 7, the logic executing on the multi-level clustered shared-memory multiprocessor system further comprising logic that:
determines if the more than one of the region hint bits within the region protocol state are set;
wherein the more than one of the region hint bits of the region protocol state being set provides an indication that the requested line of data may be cached by processors at more than one level of interconnect within the interconnect hierarchy.

11. The region coherence protocol control system of claim 7, wherein the region hint bits also provide an indication of a level of interconnect within the interconnect hierarchy that which a most recent external request for lines of data in the region of the requested line of data was received.

12. The region coherence protocol control system of claim 7, wherein:
the region hint bits further comprise one or more of:
a first set of region hint bits used for reading requests;
a second set of region hint bits used for reads to obtain a modifiable copy of the requested data;
one or more additional region hint bits to contain a history of hierarchical level of interconnect prediction; and
one or more additional region hint bits that point to a level of interconnect within the interconnect hierarchy that satisfied a previous request and that are used to route a broadcast snoop; and
the number of region hint bits used by the system is equal to the number of levels of interconnect of the interconnect hierarchy minus one.

13. A computer program product, comprising:
a computer readable recording medium; and
program code embodied in said computer readable recording medium that when executed by a computer provides a functionality, including:
generating a request by a processor for a line of data storable in a system memory;
in response to a determination that a region protocol state of an entry within a region coherence array of the system indicates that the requested line of data may be cached by processors at multiple levels of interconnect within an interconnect hierarchy of the multi-level system, determining whether one or more region hint bits within the region protocol state of an entry in the region coherence array associated with the requesting processor provide an indication that the requested line of data is cached by at least one of the multiple levels of interconnect within the interconnect hierarchy of the system, wherein the region hint bits uniquely identify each level of interconnect within the interconnect hierarchy where cached copies of the requested line of data may be stored;
in response to determining the one or more region hint bits provide an indication that the requested line of data is cached at a specific level of interconnect within the interconnect hierarchy, sending the request to the at least one level of interconnect within the interconnect hierarchy indicated by the region hint bits;
wherein a level of interconnect is one of a chip level interconnect, a same processor node interconnect or another processor node interconnect;
wherein the region coherence array is a meta-data array located in a cache hierarchy;
determining whether the request for the line of data was satisfied by the specific level of interconnect indicated by the region hint bits;
in response to determining the request for the line of data was not satisfied by the specific level of interconnect indicated by the region hint bits, updating, utilizing a most current combined snoop response, the region hint bits to indicate a level of interconnect within the interconnect hierarchy at which the request for the line of data was actually satisfied; and
sending the updated region hint bits to the one or more levels of interconnect within the interconnect hierarchy indicated by the region hint bits that do not satisfy the request for the line of data.

14. The computer program product of claim 13, further comprising the function of:
in response to determining the one or more region hint bits do not provide any indication that the requested line of data is cached by at least one level of the interconnect hierarchy, sending the request for the line of data first to a lowest level of the interconnect hierarchy of the system.

15. The computer program product of claim 13, further comprising:
in response to determining the one or more region hint bits do not provide any indication that the requested line of data is cached by at least one level of interconnect within the interconnect hierarchy, sending the request for the line of data first to a highest level of interconnect within the interconnect hierarchy of the system; and
determining if the more than one of the region hint bits within the region protocol state are set;
wherein the more than one of the region hint bits of the region protocol state being set provides an indication that the requested line of data may be cached by processors at more than one level of the interconnect hierarchy.

16. The computer program product of claim 13, wherein the region hint bits also provide an indication of a level of interconnect within the interconnect hierarchy that a most recent external request for lines of data in the region of the requested line of data was received.

17. The computer program product of claim 13, wherein:
the region hint bits further comprise one or more of:
a first set of region hint bits used for reading requests;
a second set of region hint bits used for reads to obtain a modifiable copy of the requested data;
one or more additional region hint bits to contain a history of hierarchical level of interconnect prediction; and
one or more additional region hint bits that point to a level of interconnect within the interconnect hierarchy that satisfied a previous request and that are used to route a broadcast snoop; and
the number of region hint bits used by the system is equal to the number of levels of interconnect of the interconnect hierarchy minus one.

* * * * *